US009126560B2

(12) United States Patent
Fujiwara

(10) Patent No.: US 9,126,560 B2
(45) Date of Patent: Sep. 8, 2015

(54) VEHICLE SIDE AIR BAG APPARATUS AND VEHICLE SEAT

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/484,772

(22) Filed: Sep. 12, 2014

(65) Prior Publication Data

US 2015/0076803 A1 Mar. 19, 2015

(30) Foreign Application Priority Data

Sep. 18, 2013 (JP) .................................. 2013-193435

(51) Int. Cl.
*B60R 21/207* (2006.01)
*B60R 21/231* (2011.01)

(52) U.S. Cl.
CPC ......... *B60R 21/23138* (2013.01); *B60R 21/207* (2013.01); *B60R 2021/23146* (2013.01)

(58) Field of Classification Search
CPC ............ B60R 2121/207; B60R 21/233; B60R 21/239; B60R 21/23138; B60R 2021/23146; B60R 21/23382
See application file for complete search history.

(56) References Cited

U.S. PATENT DOCUMENTS

| | | | | |
|---|---|---|---|---|
| 5,890,732 | A * | 4/1999 | Nakamura et al. | 280/729 |
| 7,021,652 | B2 * | 4/2006 | Kumagai et al. | 280/729 |
| 7,278,656 | B1 * | 10/2007 | Kalandek | 280/730.2 |
| 2005/0062266 | A1 * | 3/2005 | Steimke et al. | 280/730.2 |
| 2005/0189742 | A1 * | 9/2005 | Kumagai et al. | 280/730.2 |
| 2007/0284859 | A1 | 12/2007 | Kashiwagi | |
| 2008/0231026 | A1 | 9/2008 | Naito et al. | |
| 2010/0140906 | A1 | 6/2010 | Honda et al. | |
| 2012/0013106 | A1 * | 1/2012 | Sato et al. | 280/729 |
| 2012/0043741 | A1 * | 2/2012 | Yamamoto | 280/730.2 |
| 2012/0175925 | A1 * | 7/2012 | Suzuki et al. | 297/216.1 |

FOREIGN PATENT DOCUMENTS

| | | |
|---|---|---|
| DE | 102009057420 A1 | 6/2010 |
| EP | 2008879 B1 | 6/2012 |
| JP | A-2008-230406 | 10/2008 |
| JP | A-2009-241643 | 10/2009 |
| JP | A-2010-188891 | 9/2010 |
| JP | A-2011-51414 | 3/2011 |
| JP | A-2014-141159 | 8/2014 |
| WO | WO 2014/013822 A1 | 1/2014 |

\* cited by examiner

*Primary Examiner* — Paul N Dickson
*Assistant Examiner* — Robert A Coker
(74) *Attorney, Agent, or Firm* — Oliff PLC

(57) ABSTRACT

A vehicle side air bag apparatus includes: a bag that is housed within a side portion outside in a seat back in a vehicle width direction and inflates and expands to a vehicle front side of the side portion by supplying gas; an up-down partition that partitions the bag into lower and upper bag portions; a right-left partition which partitions the lower bag portion into left and right chambers, to which a right-left communication port is provided and which inhibits inflation of the lower bag portion in an upper and lower direction by being extended in the inflation and expansion state; an inflator provided in the upper bag portion; and a flow regulating portion that distributes gas into one of the left and right chambers and the upper bag portion and limits gas flow from the one chambers to the upper bag portion by a check valve portion.

11 Claims, 8 Drawing Sheets

FIG. 6A
FIG. 6B
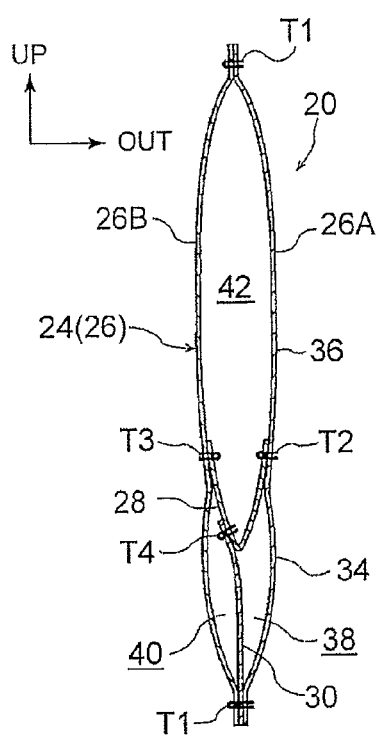
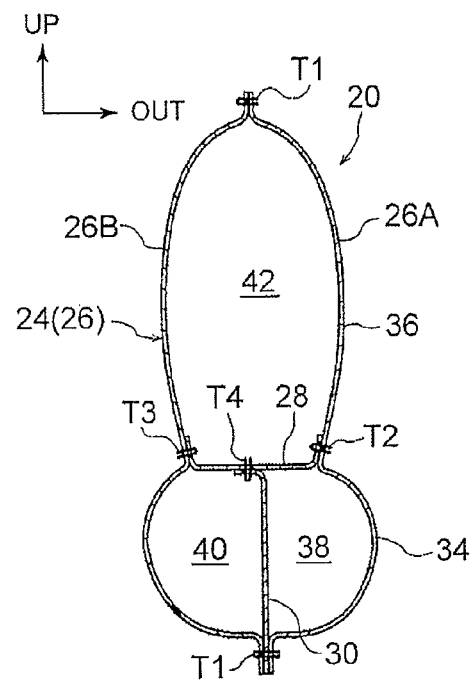

VEHICLE SIDE AIR BAG APPARATUS AND VEHICLE SEAT

INCORPORATION BY REFERENCE

The disclosure of Japanese Patent Application No. 2013-193435 filed on Sep. 18, 2013 including the specification, drawings and abstract is incorporated herein by reference in its entirety.

BACKGROUND OF THE INVENTION

1. Field of the Invention

The present invention relates to a vehicle side, air bag apparatus that inflates and expands a side air bag between an occupant and a vehicle body side portion in the event of a collision of a vehicle etc. and a vehicle seat in which the vehicle side air bag apparatus is mounted.

2. Description of Related Art

In a side air bag apparatus disclosed in Japanese Patent Application Publication No. 2009-241643 (JP 2009-241643 A), an inner side of an air bag is vertically separated to a chest region protection portion and a lumbar region protection portion, and the lumbar region protection portion is further horizontally separated to a first lumbar region protection portion (a first compartment) and a second lumbar region protection portion (a second compartment) in a laminated manner. The first compartment of the lumbar region protection portion and the chest portion protection portion communicate with each other, and gas from a first inflator is supplied to the chest region protection portion via the first compartment. This inflates and expands the entire air bag widely and immediately to protect an occupant from his chest region to his lumbar region on the lateral side. Next, gas from a second inflator is supplied to the independent second compartment of the lumbar region protection portion, so that the lumbar region with tolerance can be stably supported with a sufficient inner pressure.

In this side air bag apparatus, when the air bag inflates and expands, firstly the first compartment of the lumbar region protection portion and the chest region protection portion inflate and expand to smoothly expand the air bag into a narrow space between the lumbar region of the occupant and a vehicle body side portion.

Incidentally, the size of a space between the lumbar region of the occupant and the vehicle body side portion in the event of a side impact significantly differs depending on the form of the side impact. For example, in a case where a local load is inputted to the vehicle body side portion away from the occupant due to a so-called pole side impact etc., since the vehicle body side portion locally intrudes into a vehicle interior, there is a case that a relatively wide space can be secured between the lumbar region of the occupant and the vehicle body side portion. On the other hand, in a case where a collision load is inputted into a relatively large section of the vehicle body side portion as in a so-called MDB barrier side impact for example, since the large section intrudes into a vehicle interior, there is a case that a space between the lumbar region of the occupant and the vehicle body side portion is made narrower.

Consequently, in the above-described side air bag apparatus, when an inflation thickness (bag thickness) of the lumbar region protection portion of the air bag is set, a case where a space between the lumbar region of the occupant and the vehicle body side portion is made narrower should be considered. As a result, it is believed that the inflation thickness (especially, the inflation thickness of a lower end portion) of the lumbar region protection portion is made thinner, which deteriorates the occupant constraint property.

In addition, in the above-described side air bag apparatus, the performance in which an effect provided on the occupant is made smaller even when the air bag inflates and expands in a state that the occupant is positioned in an inappropriate position which is an inflation and expansion region of the air bag (hereinafter, OOP performance) is required. However, in order to improve this OOP performance, lowering an inner pressure of the air bag deteriorates the occupant constraint property.

SUMMARY OF THE INVENTION

The present invention provides a vehicle side air bag apparatus and a vehicle seat which render both the occupant constraint property and the OOP performance excellent.

A first aspect of the present invention relates to a vehicle side air bag apparatus. The vehicle side air bag includes: a bag that is housed within a side portion which is outside in a seat back of a vehicle seat in a vehicle width direction and inflates and expands to a vehicle front side of the side portion by supplying gas in an inner portion of the bag; an up-down partition that partitions the bag into a lower bag portion for lumbar constraint and an upper bag portion for upper body constraint; a right-left partition which partitions the lower bag portion into left and right chambers aligned in the vehicle width direction in an inflation and expansion state, to which a right-left communication port that allows mutual communication between the left and right chambers is provided and which inhibits inflation of the lower bag portion in an upper and lower direction by being extended in the inflation and expansion state; an inflator provided in the upper bag portion; and a flow regulating portion that distributes gas from the inflator into one of the left and right chambers and the upper bag portion and limits gas flow from the one of the left and right chambers to the upper bag portion by a check valve portion that protrudes to the one of the left and right chambers.

In the above aspect, when the inflator is activated, gas from the inflator is distributed into one of the left and right chambers of the lower bag portion of the bag and the upper bag portion by the flow regulating portion. This allows the bag to inflate and expand from the side portion which is outside in the seat back in the vehicle width direction to the vehicle front side. At this time, since the gas is supplied to one of the left and right chambers of the lower bag portion earlier than the other, the lower bag portion is expanded to the vehicle front side in a state that it is flat in the vehicle width direction. This provides a good expansion property of the lower bag to a narrow space between a lumbar region of an occupant seated in the vehicle seat and a vehicle body side portion.

Moreover, the gas is supplied from the one of the left and right chambers to the other via the right-left communication port of the right-left partition to inflate the other, so that an inflation width of the lower bag portion in the vehicle width direction is enlarged. Furthermore, since the right-left partition is extended due to the inflation and expansion of the lower bag portion, the inflation of the lower bag portion in the upper and lower direction is inhibited. Because of this, the inflation width of the lower bag portion in the vehicle width direction is further enlarged. Moreover, when the check valve portion of the flow regulating portion protruding to the one of the left and right chambers is closed since the inner pressure of the lower bag portion is increased, the flow of the gas from the one of the left and right chambers to the upper bag portion is limited. Consequently, the inner pressure of the lower bag portion whose inflation width in the vehicle width direction is enlarged is maintained as high, so that the lumbar region having a relatively high tolerance of the body of the occupant can be effectively constrained by the lower bag portion. As a result, the occupant constraint property can be made excellent.

Further, in this first aspect of the present invention, as described above, in the lower bag portion, one of the left and right chambers inflates and expands earlier, and the other expands later. Accordingly, the OOP performance can be made excellent compared to a case where the whole lower bag portion inflates and expands at a time.

A second aspect of the present invention relates to a vehicle seat. The vehicle seat includes: a seat main body including a seat cushion and a seat back; and the vehicle side air bag apparatus according to the above-described aspect provided in the seat back.

In the above aspect, since the vehicle side air bag apparatus according to the above-described aspect is included, the operation and effect as described above are provided.

As described above, in the vehicle side air bag apparatus according to the first aspect of the present invention and the vehicle seat according to the second aspect, both the occupant constraint property and the OOP performance can be made excellent.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A is a reduced cross-sectional view of a cutting plane taken along a line VI-VI of FIG. 2, and shows a non-inflation and expansion state of the side air bag;

FIG. 6B is a reduced cross-sectional view of a cutting plane taken along a line VI-VI of FIG. 2, and shows an inflation and expansion state of the side air bag according to the embodiment of the present invention;

DETAILED DESCRIPTION OF EMBODIMENTS

A vehicle side air bag apparatus 10 according to an embodiment of the present invention will be explained with reference to the drawings. Incidentally, an arrow FR, an arrow UP and an arrow OUT shown in each drawing appropriately respectively show a front direction (advancing direction), an upper direction and outside in a vehicle width direction. Hereinafter, unless otherwise noted, in a case where an explanation is made using merely front and rear directions, right and left directions and upper and lower directions, they refer to the front and rear in a longitudinal direction of the vehicle, the right and left in a lateral direction (width direction) of the vehicle and the up and down in a upper and lower direction of the vehicle, respectively.

(Configuration)

Figure 1:
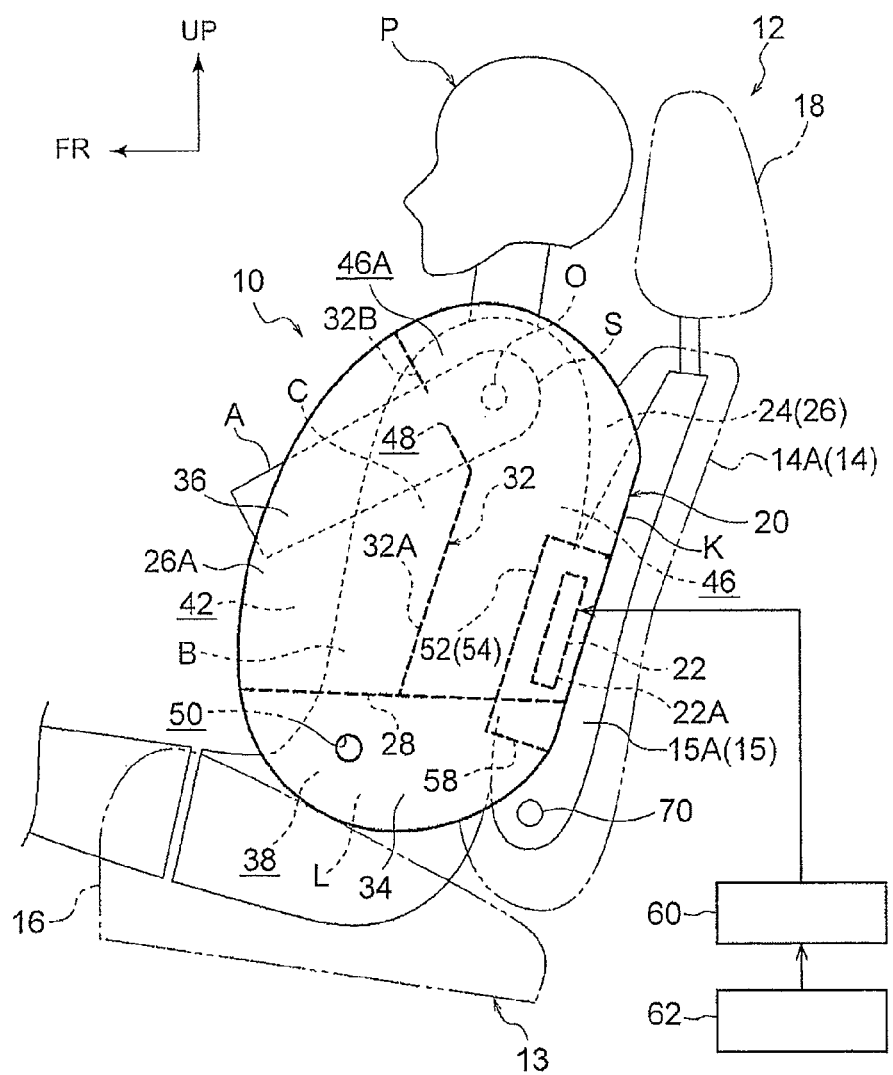
FIG. 1 is a side view that shows a side air bag of a vehicle side air bag apparatus inflates and expands in a vehicle seat according to an embodiment of the present invention.
Figure 4:
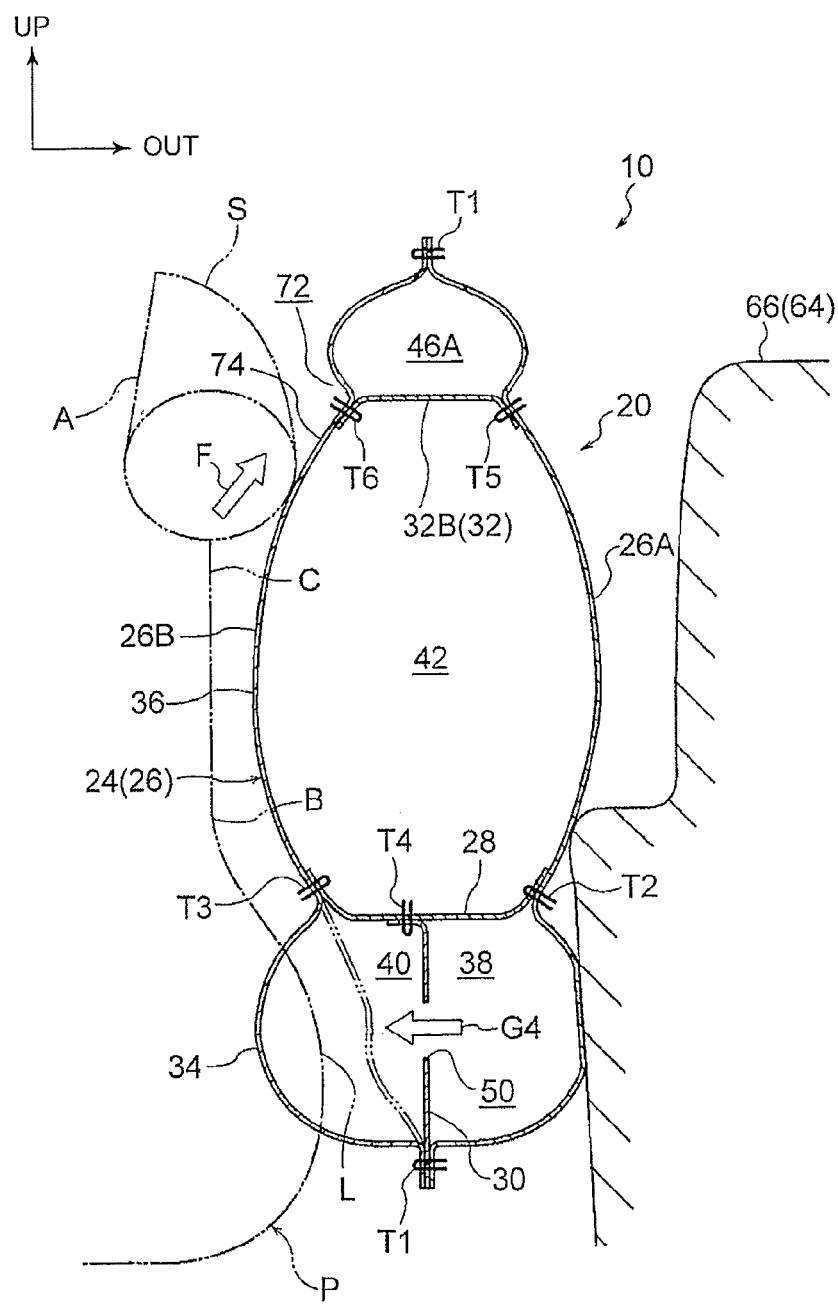
FIG. 4 is an enlarged cross-sectional view of a cutting plane taken along a line IV-IV of FIG. 2.
Figure 5:
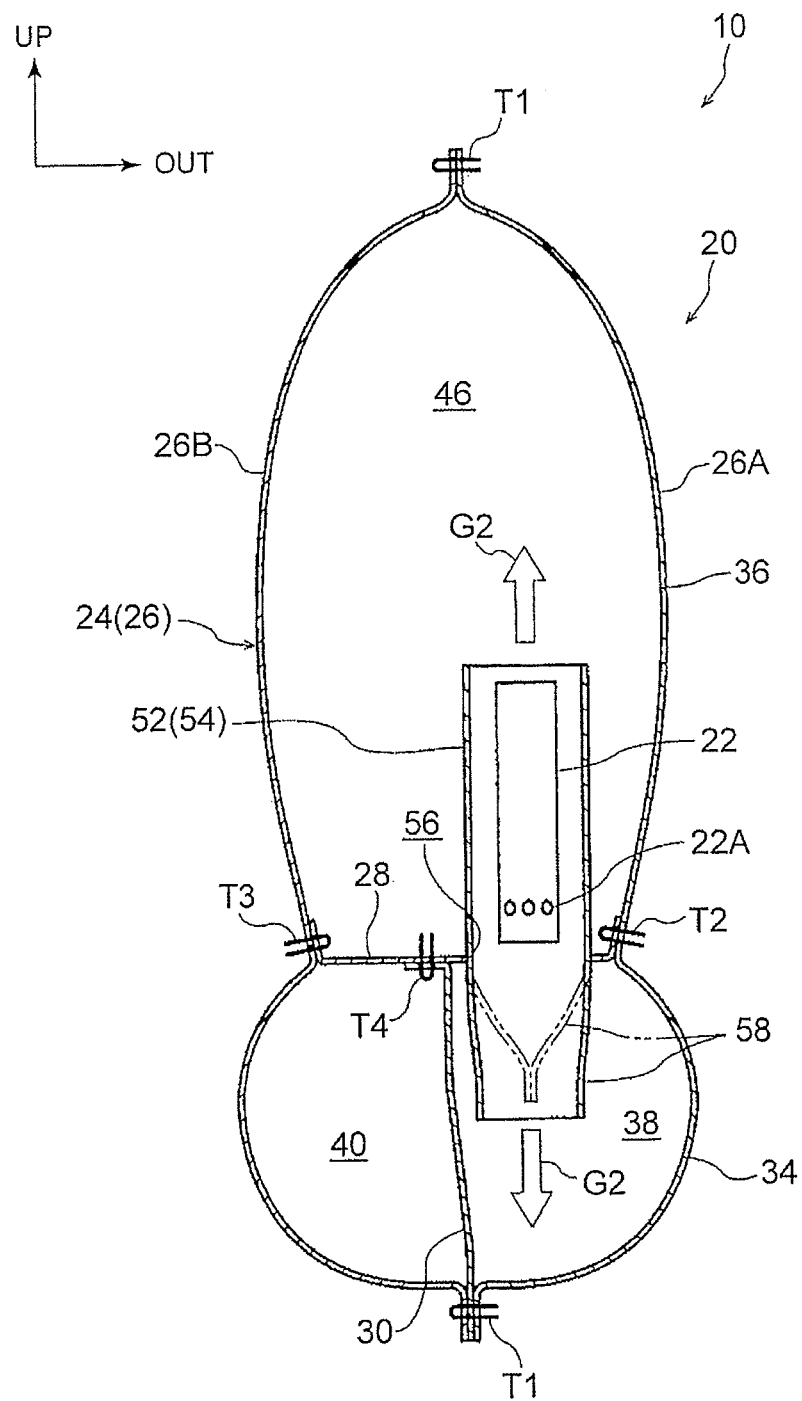
FIG. 5 is an enlarged cross-sectional view of a cutting plane taken along a line V-V of FIG. 2.

As shown in FIG. 1, a side air bag apparatus 10 according to this embodiment is mounted on a door-side side portion 14A of a seat back 14 in a seat main body 13 of a vehicle seat 12 (side portion at an outside in the vehicle width direction: a side portion at the side of a side door 64 shown in FIG. 4). This vehicle seat 12 is a driver seat of a left-hand drive car, for example. The seat back 14 of the vehicle seat 12 is tiltably connected to a rear end portion of a seat cushion 16, and a head rest 18 is connected to an upper end portion of the seat back 14.

Additionally, in this embodiment, front and rear directions, right and left directions (width direction) and upper and lower directions of the vehicle seat 12 respectively correspond to the front and rear directions, the right and left directions (width direction) and the upper and lower directions of the vehicle. Moreover, in FIG. 1, instead of an actual occupant, a dummy P for an impact test is seated in the vehicle seat 12. This dummy P is AM50 (50 percentile of American adult male) of WorldSID (world side impact dummy). Hereinafter, for easy explanation, the dummy P is referred to as "occupant P."

The side air bag apparatus 10 is constituted by a side air bag 20 and an inflator 22 (gas generating apparatus) that generates gas in the side air bag 20 as a main part. The side air bag 20 is disposed (housed) in an inner portion of the door-side side portion 14A in a state of being folded to be unitized (modularized) with the inflator 22 etc., and inflates and expands between the occupant P and the side door 64 due to the pressure of gas generated from the inflator 22. In this inflation and expansion, a seat back pad and a seat skin (both are not shown) provided for the door-side side portion 14A are configured to be ruptured receiving an inflation pressure of the side air bag 20. Additionally, unless otherwise noted, the front and rear, and the upper and lower directions of the side air bag 20 which will be described in the following explanation show the directions in a state that the side air bag 20 inflates and expands, and substantially correspond to the front and rear, and the upper and lower directions of the seat back 14.

Figure 2:
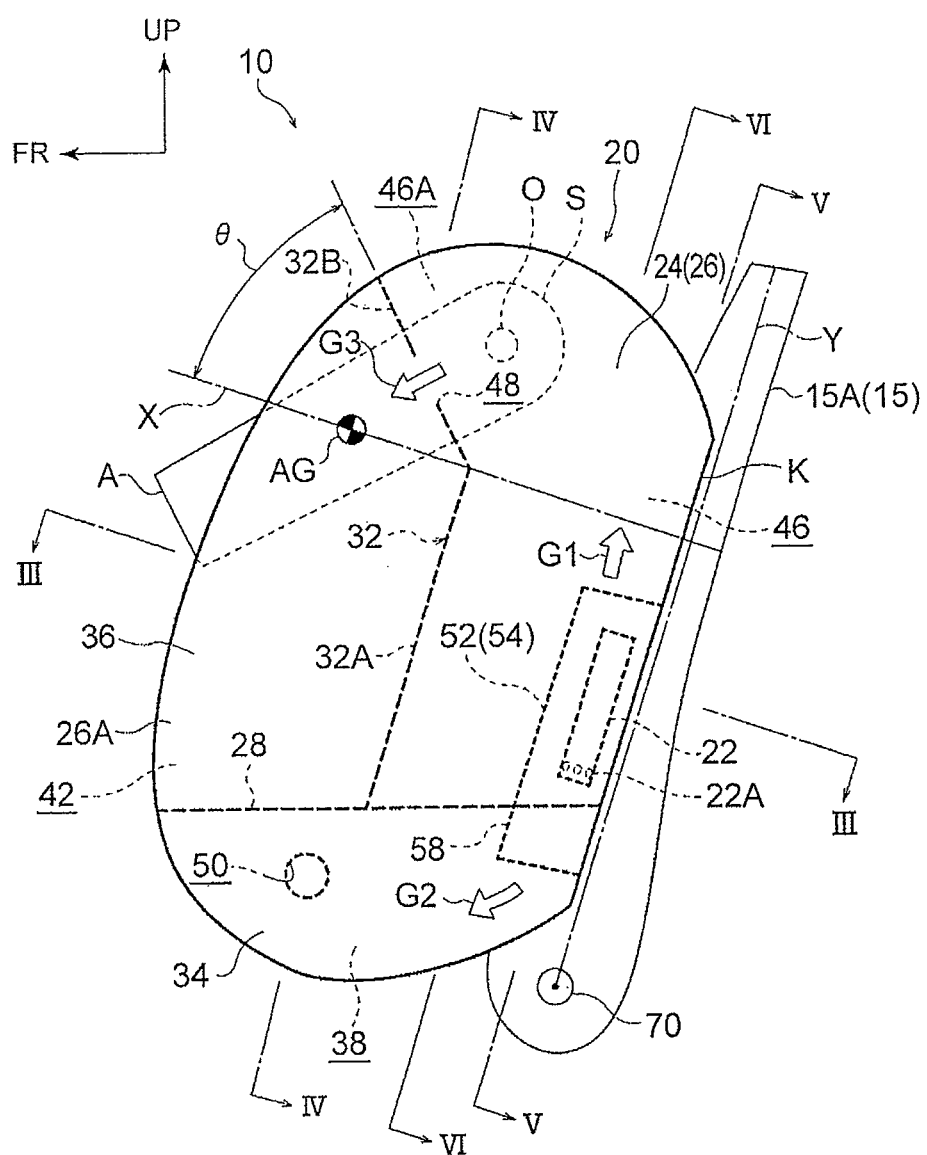
FIG. 2 is an enlarged side view of the side air bag according to the embodiment of the present invention.

As shown in FIGS. 1 to 6, the side air bag 20 is a four-chamber side air bag divided into four chambers, and includes a bag 24 formed like a bag. The bag 24 is formed by sewing one foundation cloth 26 formed by cutting a nylon-based or polyester-based cloth, for example. The foundation cloth 26 is two-folded along a folding line K, and one side portion 26A and the other side portion 26B sandwiching the folding line K are formed and their outer peripheral portions are sewn at a sewing portion T1. Additionally, in FIGS. 1 and 2, illustration of this sewing potion T1 and sewing portions T2 to T7 which will be explained later is omitted.

Seen from a side view of an inflation and expansion state as shown in FIGS. 1 and 2, this bag 24 is formed in the substantially oblong shape elongated in an upper and lower direction of the seat back 14, and set to be in a size that allows to constrain a shoulder region S, a chest region C, an abdominal region B and a lumbar region L of the occupant P. In an inner portion of the bag 24, an up-down dividing tether 28 as an up-down partition, a right-left dividing tether 30 as a right-left partition and a front-rear dividing tether 32 as a front-rear partition are provided.

The up-down dividing tether 28 is formed by cutting a cloth which is similar to the foundation cloth 26 to have an elongated shape, and disposed at a lower portion side in an inner portion of the bag 24. One long side end portion of this up-down dividing tether 28 is sewn to one side portion 26A of the foundation cloth 26 at the sewing portion T2, and the other long side end portion of the up-down dividing tether 28 is sewn to the other side portion 26B of the foundation cloth 26 at the sewing portion T3. By this up-down dividing tether 28, the bag 24 is divided into a lower bag portion 34 for constraining the lumbar region and an upper bag portion 36 for constraining the upper body (here, for constraining the shoulder region S, the chest region C and the abdominal region B).

The right-left dividing tether 30 is formed by cutting a cloth which is similar to the foundation cloth 26 to have an elongated shape, and disposed in the lower bag portion 34. One long side end portion of this right-left dividing tether 30 is sewn to a center portion in a width direction of the up-down diving tether 28 at the sewing portion T4, and the other long side end portion of the right-left diving tether 30 is sewn to a lower end peripheral portion of the bag 24 at the sewing portion T1. By this right-left dividing tether 30, the lower bag portion 34 is divided into a left chamber 38 and a right chamber 40.

The front-rear dividing tether 32 is formed by cutting a cloth which is similar to the foundation cloth 26 to have an elongated shape, and disposed in the upper bag portion 36. One long side end portion of the front-rear dividing tether 32 is sewn to one side portion 26A of the foundation cloth 26 at the sewing portion T5, and the other long side end portion of the front-rear dividing tether 32 is sewn to the other side portion 26B of the foundation cloth 26 at the sewing portion T6. By this front-rear dividing tether 32, the upper bag portion 36 is divided into a front chamber 42 and a rear chamber 46. The front-rear dividing tether 32 is constituted by a up-down partition 32A extending along the upper and lower direction of the seat back 14 and an upper partition 32B (inclined partition) extending obliquely upward toward the front of the seat back 14 from an upper end of the up-down partition 32A.

As shown in FIGS. 1 and 2, the front chamber 42 and the rear chamber 46 communicate with each other via a front-rear communication port 48 (opening) formed in the upper partition 32B of the front-rear dividing tether 32. Moreover, the left chamber 38 and the right chamber 40 communicate with each other via a right-left communication port 50 (opening) formed in the right-left dividing tether 30. Additionally, while the front-rear communication port 48 is formed in the upper partition 32B in this embodiment, not limited to this, the front-rear communication port may be formed in the up-down partition 32A. Moreover, while the right-left communication port 50 is formed in a front part of the right-left dividing tether 30 in this embodiment, not limited to this, a forming position of the right-left communication port 50 in the right-left dividing tether 30 may be appropriately varied.

In addition, a flow regulating cloth 52 constituting a flow regulating portion is provided for the rear chamber 46. The flow regulating cloth 52 is formed to be tubular by sewing a foundation cloth 54 (see FIGS. 3 and 5) made of a cloth which is similar to the foundation cloth 26 etc. at the sewing portion T7 (see FIG. 3). The flow regulating cloth 52 is disposed at a lower portion of the rear chamber 46 in a state that its axial direction is along the upper and lower direction of the seat back 14, and its upper end opening is positioned near a lower portion of a forward extending portion 46A which will be explained later. This flow regulating cloth 52 is disposed outside than a center portion of the rear chamber 46 in the vehicle width direction after the inflation and expansion.

Also, a lower end portion of the flow regulating cloth 52 penetrates through an opening 56 formed in the up-down dividing tether 28 to protrude into the left chamber 38. This protruding portion constitutes a check valve portion 58.

Moreover, an inflator 22 is housed in the rear chamber 46. The inflator 22 is a so-called cylinder type inflator and formed to be columnar. This inflator 22 is disposed in the rear chamber 46 in a state that its axial direction is along the upper and lower direction of the seat back 14, and housed within the flow regulating cloth 52.

An upper and lower pair of studs (illustration is omitted) protrude to a rear side of the vehicle from an outer peripheral portion of the inflator 22. These studs penetrate through the foundation clothes 26, 54 and a not shown bracket fixed to a side frame 15A of a seat back frame 15 (see FIGS. 1 and 2), and a not shown nut is threaded to its distal end side. Because of this, the inflator 22 is fastened to be fixed (so-called back tightening) to the side frame 15A with the side air bag 20.

A gas ejection portion 22A is provided at a lower end portion of the inflator 22. In this gas ejection portion 22A, a plurality of gas ejection ports arranged in a circumferential direction of the inflator 22 is formed, and when the inflator 22 is activated, gas is radially ejected from the plurality of gas ejection ports.

As shown in FIG. 1, to this inflator 22, a side impact ECU 60 mounted on the vehicle is electrically connected. To this side impact ECU 60, a side impact sensor 62 that detects a side impact is electrically connected. The side impact ECU 60 is configured to activate the inflator 22 when it detects (inevitability of) a side impact based on a signal from the side impact sensor 62. Additionally, a configuration can be made such that, in a case where a pre-crash sensor that predicts (projects) a side impact is electrically connected to the side impact ECU 60, the inflator 22 is activated when the side impact ECU 60 predicts a side impact based on a signal from the pre-crash sensor.

In the side air bag apparatus 10 having the above configuration, when the inflator 22 is activated, gas is ejected from the gas ejection portion 22A of the inflator 22. The gas ejected from the gas ejection portion 22A is ejected (distributed) to an upper portion of the rear chamber 46 from the upper end opening of the flow regulating cloth 52 (see an arrow G1 of FIG. 2) and ejected (distributed) to the left chamber 38 from a lower end opening of the flow regulating cloth 52 (see an arrow G2 of FIG. 2). The gas ejected to the upper portion of the rear chamber 46 passes through the front-rear communication port 48 to be supplied to an upper portion of the front chamber 42 (see an arrow G3 of FIG. 2). Moreover, the gas ejected to the left chamber 38 passes through the right-left communication port 50 to be supplied to the right chamber 40 (see an arrow G4 of FIG. 4).

Thus, the side air bag 20 (bag 24) inflates and expands between the occupant P and a door trim 66 (side portion of a vehicle body) of the side door 64. In this inflation and expansion state, the lower bag portion 34 is positioned below the upper bag portion 36, the front chamber 42 is positioned at the vehicle front side of the rear chamber 46 and the left chamber 38 is positioned at an outside of the right chamber 40 in the vehicle width direction. Moreover, by a front portion of the upper bag portion 36 (front chamber 42), front portions (front half portion) of the chest region C as well as the abdominal region B of the occupant P are constrained. Moreover, by a rear portion and an upper portion of the upper bag portion 36 (rear chamber 46), the shoulder region S and rear portions (rear half portion) of the chest region C as well as the abdominal region B of the occupant P are constrained. Moreover, by the lower bag portion 34, the lumbar region L of the occupant P is constrained. Hereinafter, the inflation and expansion state of the side air bag 20 will be explained in detail.

Figure 3:
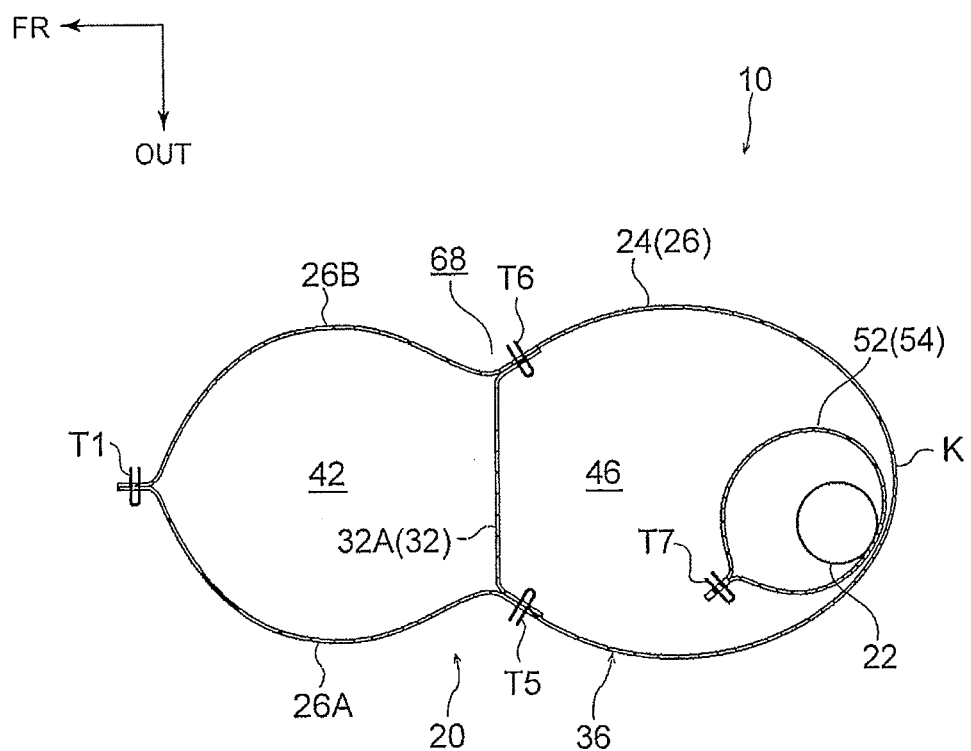
FIG. 3 is an enlarged cross-sectional view of a cutting plane taken along a line III-Ill of FIG. 2.

The up-down partition 32A of the front-rear dividing tether 32 is provided to extend in the upper and lower direction of the seat back along a center portion in the front-rear direction of the chest region C and the abdominal region B of the occupant P. As shown in FIG. 3, near the up-down partition 32A, an inner surface of the side air bag 20 in the vehicle width direction is recessed outside in the vehicle width direction to form a recess 68. This recess 68 extends in the upper and lower direction of the seat back along the up-down partition 32A. This recess 68 faces the center portion in the front-rear direction of the chest region C and the abdominal region B (that is, the most protruding portion outside in the vehicle width direction).

On the other hand, the upper partition 32B is provided to extend obliquely upward toward the front of the seat back 14 from the upper end of the up-down partition 32A. That is, the upper partition 32B is inclined to ascend as it goes to the front side of the seat back 14 to a front-rear direction of the seat back 14 (a direction along a dashed line X of FIG. 2). Additionally, the front-rear direction of the seat back 14 is one which is orthogonal to the upper and lower direction of the seat back 14 (a direction along a dashed line Y of FIG. 2) viewed from a lateral side of the seat. Moreover, the upper and lower direction of the seat back 14 is one that connects the center in a front-rear direction of an upper end portion of the seat back frame 15 and the axis of a reclining rod 70. Moreover, an inclined angle $\theta$ of the upper partition 32B to the front-rear direction of the seat back 14 is preferably within a range of 30 to 60°, and more preferably within a range of 40 to 50°.

This upper partition 32B is set to be positioned near the center between a center O of the shoulder region S of the occupant P and a center portion in a longitudinal direction of an upper arm region A (a position of a center of gravity AG of the upper arm region A or a position near the center of gravity AG) when the inflation and expansion state of the side air bag 20 is seen from the vehicle width direction. By setting this upper partition 32B, the forward extending portion 46A for constraining the shoulder divided from the front chamber 42 is formed on the upper portion of the rear chamber 46. This forward extending portion 46A inflates and expands to an upper side of the front chamber 42 to constrain the shoulder region S of the occupant P.

Moreover, as shown in FIG. 4, near the upper partition 32B, the inner surface in the vehicle width direction of the side air bag 20 is recessed outside in the vehicle width direction to form a recess 72. This recess 72 extends obliquely upward toward the front of the seat back 14 along the upper partition 32B. Moreover, in an inner surface of the front chamber 42 in the vehicle width direction, an upper side is curved to ascend as it goes outside in the vehicle width direction than the center portion in the upper and lower direction. Hereinafter, this curved surface is referred to as an upper arm lifting surface 74.

On the other hand, the up-down dividing tether 28 is provided to extend in the front-rear direction of the vehicle at the height between the abdominal region B and the lumbar region L of the occupant P. The lower bag portion 34 divided from the upper bag portion 36 by this up-down dividing tether 28 is set to have a larger length dimension in the front-rear direction of the vehicle than that of the lumbar region L of the occupant P, and constrains the lumbar region L in a wide range in the front-rear direction of the vehicle. In addition, the up-down dividing tether 28 is set to be inclined forwardly downward to the front-rear direction of the seat back 14 (the direction along the dashed line X of FIG. 2) when the inflation and expansion state of the side air bag 20 is seen from the vehicle width direction. Because of this, the inflation thickness of the inflated and expanded lower bag portion 34 in the upper and lower direction of the vehicle is configured to be smaller as it goes to the vehicle front side.

Figure 8:
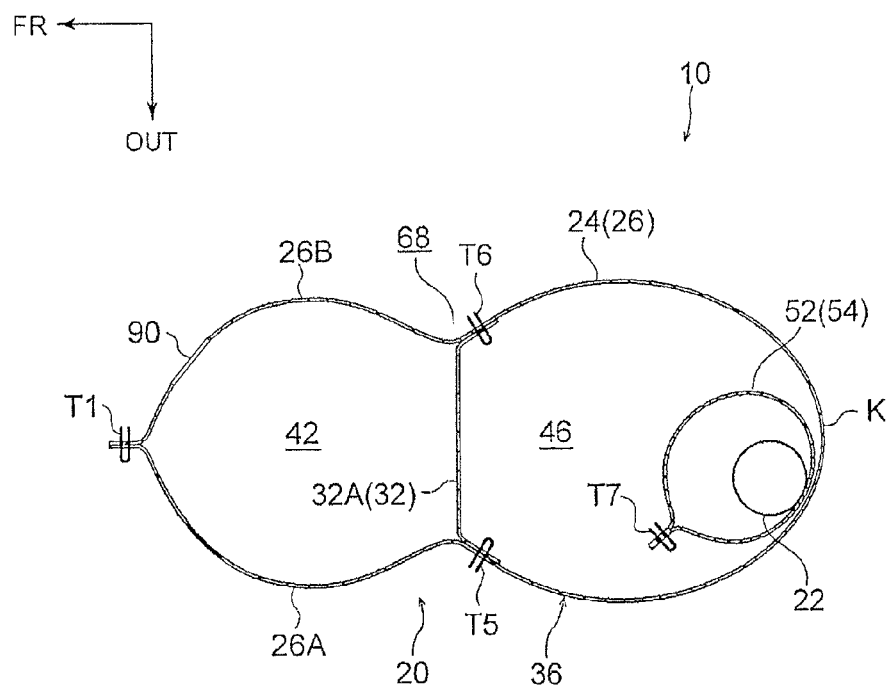
FIG. 8 is an enlarged cross-sectional view corresponding to FIG. 3 showing a modified example of the side air bag according to the embodiment of the present invention.

Moreover, in this embodiment, the gas ejected to the upper portion of the rear chamber 46 from the upper end opening of the flow regulating cloth 52 passes through the front-rear communication port 48 of the upper partition 32B and is supplied to the front chamber 42. Due to this, an inner pressure P1 of the front chamber 42 is lower than an inner pressure P2 of the rear chamber 46 (P1<P2). Additionally, a configuration can be made such that a vent hole 90 (FIG. 8) is formed on a front end edge portion etc. of the upper bag portion 36 and the gas supplied to the front chamber 42 is discharged to the outside of the side air bag 20 via the above-described vent hole 90. Consequently, a remained portion of the front chamber 42 which is not crushed is lessened at the time of occupant constraint, which ensures an impact absorption stroke of the front chamber 42 excellently.

Further, in this embodiment, as described above, the gas ejected to the left chamber 38 of the lower bag portion 34 from the lower end opening of the flow regulating cloth 52 passes through the right-left communication port 50 to be supplied to the right chamber 40. Because of this, when an inner pressure of the left chamber 38 is a predetermined set value or more after the left and right chambers 38, 40 inflate and expand, the check valve portion 58 constituted by the lower end portion of the flow regulating cloth 52 is closed by the inner pressure of the left chamber 38 (crushed as shown in a phantom line in FIG. 5). This limits the flow of the gas from the left chamber 38 to the rear chamber 46. As a result, an inner pressure P3 of the lower bag portion 34 is maintained to be higher than the inner pressure P2 of the rear chamber 46 (P2<P3).

Also, in this embodiment, in the inflation and expansion state of the lower bag portion 34, the dimension in the upper and lower direction of the right-left dividing tether 30 is set such that inflation in the upper and lower direction of the lower bag portion 34 is inhibited by extending the right-left dividing tether 30 in the upper and lower direction. Due to this, the inflation width of the lower bag portion 34 in the vehicle width direction is enlarged. Additionally, FIG. 6A shows a non-inflation and expansion state of the side air bag 20 in a vertical cross-sectional view, and FIG. 6B shows an inflation and expansion state (inflation and expansion completed state) of the side air bag 20 in a vertical cross-sectional view. As shown in FIG. 6A, in the non-inflation and expansion state, the side air bag is two-folded such that it protrudes to the side of the lower bag portion along a folding line in a center portion in a longitudinal direction of the up-down partition. Moreover, in this embodiment, the left and right chambers 38, 40 are set such that each inflation width in the vehicle width direction is equal.

(Operation and Effect)

Next, an operation and an effect of this embodiment will be explained.

In the side air bag apparatus 10 having the above configuration, when the side impact ECU 60 detects a side impact from a signal from the side impact sensor 62, the inflator 22 is activated by the side impact ECU 60. Thereafter, gas ejected from the inflator 22 is distributed into the left chamber 38 of the lower bag portion 34 of the side air bag 20 and the rear chamber 46 of the upper bag portion 36 of the side air bag 20. Consequently, the side air bag 20 inflates and expands from the door-side side portion 14A of the seat back 14 to the vehicle front side. At this time, since the gas is supplied to the left chamber 38 of the lower bag portion 34 earlier than the right chamber 40, the lower bag portion 34 expands to the vehicle front side in a state that it is flat in the vehicle width direction (as shown in a phantom line in FIG. 4, a state that the right chamber 40 does not expand). This provides a good expansion property of the lower bag portion 34 to a narrow space between the lumbar region L of the occupant P seated in the vehicle seat 12 and the door trim 66.

Moreover, the gas is supplied from the left chamber 38 to the right chamber 40 via the right-left communication port 50 of the right-left dividing tether 30 to inflate the right chamber 40, so that the inflation width of the lower bag portion 34 in the vehicle width direction is enlarged. Furthermore, since the right-left diving tether 30 is extended in the upper and lower direction due to the inflation and expansion of the lower bag portion 34, the inflation of the lower bag portion 34 in the upper and lower direction is inhibited. Because of this, the inflation width of the lower bag portion 34 in the vehicle width direction is further enlarged. Moreover, when the check valve portion 58 of the flow regulating cloth 52 protruding to the left chamber 38 is closed since the inner pressure of the lower bag portion 34 is increased to a set value or more (see the phantom line of FIG. 5), the flow of the gas from the left chamber 38 to the rear chamber 46 is limited. Consequently, the inner pressure of the lower bag portion 34 whose inflation width in the vehicle width direction is enlarged is maintained as high, so that the lumbar region L having a relatively high tolerance of the body of the occupant P can be effectively constrained by the lower bag portion 34. As a result, the occupant constraint property can be made excellent.

Further, in this embodiment, not the whole lower bag portion 34 inflates and expands at a time, but the right chamber 40 inflates later than the left chamber 38. Accordingly, the performance that reduces the influence to be provided to the occupant P even when the side air bag 20 inflates and expands in a state that the occupant P is positioned at an inappropriate position which is an inflation and expansion region of the side air bag 20 (hereinafter, referred to as OOP performance) can be made excellent.

Moreover, in this embodiment, the gas supplied from the inflator 22 to the rear chamber 46 is supplied to the front chamber 42 of the upper bag portion 36 via the front-rear communication port 48 provided in the front-rear dividing tether 32. Consequently, since the front chamber 42 inflates and expands later than the rear chamber 46, the influence that the occupant P in the inappropriate position receives from the front chamber 42 can be reduced. As a result, the OOP performance can be made more excellent.

Further, the rear chamber 46 which receives the gas supply earlier than the front chamber 42 inflates and expands earlier with a higher pressure than the front chamber 42. At the upper portion of the rear chamber 46, the forward extending portion 46A for constraining the shoulder extending to the upper side of the front chamber 42 in the inflation and expansion state of the bag 24 is provided. Since the shoulder region S of the occupant P can be constrained early and effectively by the forward extending portion 46A, the occupant constraint property can be made more excellent.

Furthermore, in this embodiment, the left chamber 38 of the lower bag portion 34 receives the gas supply earlier than the right chamber 40. Due to this, the left chamber 38 inflates and expands earlier with a higher pressure than the right chamber 40. The left chamber 38 is positioned outside in the vehicle width direction (at the side of the vehicle body side portion) to the right chamber 40 in the inflation and expansion state of the side air bag 20. That is, the left chamber 38 on the remote side from the occupant P inflates and expands early with a high pressure, which makes the OOP performance more excellent.

Moreover, in this embodiment, the up-down dividing tether 38 is set to be inclined forwardly downward to the front-rear direction of the seat back 14 when the inflation and expansion state of the side air bag 20 is seen from the vehicle width direction. Consequently, a configuration is made such that the inflation width of the lower bag portion 34 that inflates and expands in the upper and lower direction of the vehicle becomes smaller as it goes to the vehicle front side, so that the OOP performance can be improved. That is, even when the side air bag 20 inflates and expands in a state that the occupant P or luggage etc. is positioned at a lower front portion of the door-side side portion 14A, the influence that the occupant or the luggage etc. receives from the lower bag portion 34 can be reduced.

Also, in this embodiment, by the upper portion and the rear portion of the upper bag portion (rear chamber 46) that inflates and expands early with a high pressure and the lower bag portion 34, the shoulder region S, rear portions of the chest region C as well as the abdominal region B and the lumbar region L having a relatively high load tolerance can be constrained early and effectively. On the other hand, by the front portion of the upper bag portion 36 (front chamber 42) having a lower inner pressure than that of the rear chamber 46 and the lower bag portion 34, the front portions of the chest region C and the abdominal region B having a relatively low load tolerance can be constrained softly.

Moreover, in this embodiment, the forward extending portion 46A provided at the upper portion of the rear chamber 46 is divided from the front chamber 42 by the upper partition 32B extending obliquely upward toward the front of the seat back 14 from the upper end of the up-down partition 32A, and inflates and expands to the upper side of the front chamber 42. That is, by setting the upper partition 32B extending forwardly upward to the front-rear direction of the seat back 14, the upper portion of the rear chamber 46 (forward extending portion 46A) extends to the upper side of the front chamber 42 to constrain the shoulder region S of the occupant P. By setting the upper partition 32B as described above, while inhibiting the increase of the volume of the rear chamber 46, the upper portion of the rear chamber 46 (forward extending portion 46A) is allowed to face the shoulder region S of the occupant P successfully.

Further, as shown in FIG. 4, the inner surface of the inflated and expanded front chamber 42 in the vehicle width direction is the upper arm lifting surface 74 in which an upper side is curved to ascend as it goes outside of the vehicle width direction than the center portion in the upper and lower direction. Consequently, when the side air bag 20 and the occupant P are relatively close due to a shock of a side impact, the upper arm lifting surface 74 and an upper arm region A of the occupant P contact while sliding, which generates a force F that pushes the upper arm region A upward. As a result, the upper arm region A is pushed to the upper side of the front chamber 42 to be constrained by the forward extending portion 46A. This inhibits intervening of the upper arm region A between the chest region C of the occupant P and the side air bag 20, so that a load on the chest region C can be reduced.

Moreover, in this embodiment, the upper partition 32B is positioned near the center between the center of the shoulder region S of the occupant P and the center portion of the upper arm region A of the occupant P in the longitudinal direction (near the center of gravity AG of the upper arm region A) when the inflation and expansion state of the side air bag 20 is seen from the vehicle width direction. Therefore, compared to a case where the upper partition 32B is set near the center of gravity AG of the upper arm region A, the push-up force F of the upper arm region A by the front chamber 42 can be excellently operated near the center of gravity AG of the upper arm region A. This allows the upper arm region A to be lifted effectively.

That is, for example, when the upper partition 32B is set along the X line of FIG. 2, the upper partition 32B passes near the center of gravity AG of the upper arm region A. As shown in FIG. 4, near the upper partition 32B, the inner surface of the side air bag 20 in the vehicle width direction is recessed Outside in the vehicle width direction to form a recess (valley) 72, so that the recess 72 abuts a portion near the center of gravity AG of the upper arm region A. Since the recess 72 is formed in an upper end portion (end point on an upper side) of the upper arm lifting surface 74, a distance and a time that the portion near the center of gravity AG of the upper arm region A contacts while sliding with the upper arm lifting surface 74 are shortened, which inhibits the push-up force F from operating to the portion near the center of gravity AG of the upper arm region A sufficiently. On the contrary, in this embodiment, when the upper arm region A starts to contact while sliding with the upper arm lifting surface 74, as the center of gravity AG is fully separated from the recess 72 (upper partition 32B) downwardly, the push-up force F from the upper arm lifting surface 74 can be successfully operated to the portion near the center of gravity AG of the upper arm region A. As a result, the upper arm region A can be lifted effectively.

Moreover, as described above, the forward extending portion 46A extends to the front side of the vehicle from a lateral side of the shoulder region S of the occupant P and is disposed on the upper side of the front chamber 42. Accordingly, even when a form of a side impact is a so-called angular side impact and the occupant P is subjected to inertial migration diagonally toward the front of the vehicle, the shoulder region S of the occupant P cannot be displaced from the forward extending portion 46A. Thus, irrespective of the form of the side impact, the shoulder region S of the occupant P can be successfully constrained by the side air bag 20, and the constraint of the shoulder region S can be maintained to the latter half of the impact.

Also, in this embodiment, in FIG. 2, in a case where the side air bag 20 is cut along a line that connects the center O of the shoulder region S of the occupant P and the center of gravity AG of the upper arm region A, the recess 72 is formed between the center of the shoulder region S and the center of gravity AG of the upper arm region A. Since this recess 72 extends obliquely upward toward the front of the seat back 14 along the upper partition 32B, at a front end side of the forward extending portion 46A, a curved surface extending outside in the vehicle width direction as it goes obliquely downward toward the front of the seat back 14 is formed. Consequently, when the inflated and expanded side air bag 20 is relatively close to the occupant P due to a shock of a side impact, in addition to the push-up operation of the upper arm region A which has been already described, the shoulder region S of the occupant P which is outside in the vehicle width direction moves to the upper partition 32B side (to the front side of the vehicle) along the above-described curved surface.

Consequently, the upper body of the occupant P is rotated around the substantially perpendicular axis toward a direction that the shoulder region S which is outside in the vehicle width direction moves to the front side of the vehicle, which causes the back of the occupant P to face the side air bag 20. Thus, a portion on the side of the back having a relatively high load tolerance can be effectively constrained by the side air bag 20. Also, since the chest region C is displaced (rotated) to a direction that is away from the side air bag 20, a load on the chest region C can be further reduced. Further, since the shoulder region S outside in the vehicle width direction is moved to the front side of the vehicle to be fitted into the recess 72, the shoulder region S is difficult to be displaced from the forward extending portion 46A which is a shoulder constraining portion, so that the shoulder region S can be successfully constrained continuously even in an angular side impact.

<Supplementary Explanation of the Embodiment>

Figure 7:
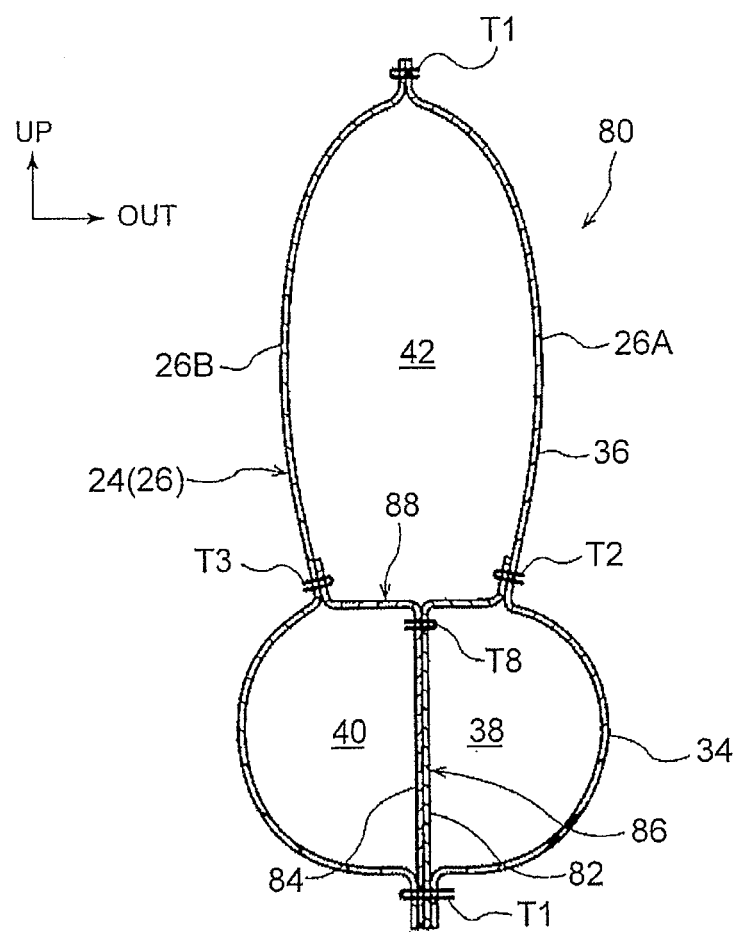
FIG. 7 is a cross-sectional view corresponding to FIG. 6B showing a modified example of the side air bag according to the embodiment of the present invention.

While the up-down dividing tether 28 (up-down partition) and the right-left dividing tether 30 (right-left partition) are formed by different clothes in the above embodiment, the present invention is not limited to this and may be configured as in a modified example 80 shown in FIG. 7. In this modified example 80, a pair of superimposed clothes 82, 84 is sewn at sewing portions T1, T8 to form a right-left partition 86. Moreover, an upper end portion than the sewing portion T8 in these clothes 82, 84 is two-forked and sewn to one side portion 26A and the other side portion 26B of the foundation cloth 26 at the sewing portions T2 and T3. This forms an up-down partition 88. Other than that, irrespective of a manufacturing method in the above embodiment, a manufacturing method of the side air bag 20 may be appropriately modified.

Moreover, while it is configured that, of the left and right chambers 38, 40 of the lower bag portion 34, the left chamber 38 positioned outside in the vehicle width direction in the inflation and expansion state of the side air bag 20 receives the gas supply earlier than the right chamber 40 in the above embodiment, the present invention is not limited to this. That is, in the above embodiment, a configuration can be made such that the lower end portion of the flow regulating cloth 52 (check valve portion 58) protrudes to the right chamber 40. In that case, since the right chamber 40 which is close to the lumbar region L of the occupant P inflates and expands earlier, the initial constraint property of the lumbar region L can be improved, which contributes to the improvement of the occupant constraint property.

Moreover, while the inflation widths of the left and right chambers 38, 40 in the vehicle width direction are equally set in the above embodiment, the present invention is not limited to this, and a configuration can be made such that the inflation width of one of the left and right chambers 38, 40 is set to be larger than that of the other of the left and right chambers 38, 40. In this case, by making the inflation width of the chamber that receives the gas supply earlier larger, the initial constraint property of the lower bag portion 34 can be made excellent. Also in this case, when the side air bag 20 is folded, the sewing portions T2 and T3 etc. are not overlapped, which allows the side air bag 20 to be folded compactly.

Also, while the upper bag portion 36 is divided into the front chamber 42 and the rear chamber 46 by the front-rear dividing tether 32 (front-rear partition) and the forward extending portion 46A is provided on the upper portion of the rear chamber 46 in the above embodiment, the present invention is not limited to this. A configuration can be made such that the forward extending portion 46A is omitted (the configuration in which a portion of the forward extending portion 46A is the front chamber 42) or the front-rear dividing tether 32 is omitted.

Further, while the lower end portion of the flow regulating cloth 52 (flow regulating portion) is the check valve portion 58 in the above embodiment, the present invention is not limited to this, and a configuration can be made such that the flow regulating portion and the check valve portion are separately provided.

Other than that, the present invention can be executed with various modifications without departing the gist of the present invention. Moreover, needless to say, the scope of right of the present invention is not limited to the above embodiment.

What is claimed is:

1. A vehicle side air bag apparatus comprising:
a bag that is housed within a side portion which is outside in a seat back of a vehicle seat in a vehicle width direction and inflates and expands to a vehicle front side of the side portion by supplying gas in an inner portion of the bag;
an up-down partition that partitions the bag into a lower bag portion for lumbar constraint and an upper bag portion for upper body constraint;
a right-left partition which partitions the lower bag portion into left and right chambers aligned in the vehicle width direction in an inflation and expansion state, to which a right-left communication port that allows mutual communication between the left and right chambers is provided and which inhibits inflation of the lower hag portion in an upper and lower direction by being extended in the inflation and expansion state;
an inflator provided in the upper bag portion; and
a flow regulating portion that distributes gas from the inflator into one of the left and right chambers and the upper bag portion and limits gas flow from the one of the left and right chambers to the upper bag portion by a check valve portion that protrudes to the one of the left and right chambers.

2. The vehicle side air bag apparatus according to claim 1, further comprising:
a front-rear partition which partitions the upper bag portion into a front chamber and a rear chamber aligned in a front-rear direction of the vehicle in the inflation and expansion state and to which a front-rear communication port that allows mutual communication between the front chamber and the rear chamber is provided, wherein gas from the inflator is distributed to the rear chamber by the flow regulating portion and at an upper portion of the rear chamber, a forward extending portion for shoulder constraint that extends to an upper side of the front chamber in the inflation and expansion state is provided.

3. The vehicle side air bag apparatus according to claim 1, wherein
the one of the left and right chambers is positioned outside in the vehicle width direction to the other of the left and right chambers in the inflation and expansion state.

4. The vehicle side air bag apparatus according to claim 1, wherein
the up-down partition is set to be inclined forwardly downward to a front-rear direction of the seat back when the inflation and expansion state is seen from the vehicle width direction.

5. The vehicle side air bag apparatus according to claim 1, wherein
the flow regulating portion is disposed outside than a center portion of the rear chamber in the vehicle width direction after inflation and expansion.

6. The vehicle side air bag apparatus according to claim 1, wherein
a vent hole is formed on a front end edge portion of the upper bag portion.

7. The vehicle side air bag apparatus according to claim 1, wherein
the right-left partition is a right-left dividing tether, and
in an inflation and expansion state of the lower bag portion, a dimension in the upper and lower direction of the right-left dividing tether is set such that inflation of the lower bag portion in the upper and lower direction is inhibited by extending the right-left dividing tether in the upper and lower direction.

8. The vehicle side air bag apparatus according to claim 1, wherein
the bag is two-folded to protrude to the lower bag portion along a folding line in a center portion of the up-down partition in a longitudinal direction in a non-inflation and expansion state.

9. The vehicle side air bag apparatus according to claim 1, wherein
the up-down partition and the right-left partition are constituted by a part of a same foundation cloth respectively,
the right-left partition is formed by sewing a pair of superimposed foundation clothes at upper and lower portions,
the up-down partition is formed by allowing an upper end portion of a sewing portion to be two-forked and sewing each two-forked portion to one side portion and the other side portion of the foundation cloth of the bag.

10. The vehicle side air bag apparatus according to claim 1, wherein
an inflation width of one of the partitioned left and right chambers is larger than that of the other of the partitioned left and right chambers.

11. A vehicle seat comprising:
a seat main body including a seat cushion and a seat back; and
the vehicle side air bag apparatus according to claim 1 provided in the seat back.

* * * * *